US010987261B2

(12) United States Patent  
Raja et al.

(10) Patent No.: US 10,987,261 B2  
(45) Date of Patent: Apr. 27, 2021

(54) MOBILE OBJECT

(71) Applicant: SUZUKI MOTOR CORPORATION, Hamamatsu (JP)

(72) Inventors: Gopinath Raja, Hamamatsu (JP); Masayoshi Wada, Hamamatsu (JP); Baku Matsuura, Hamamatsu (JP); Shunya Sakurai, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 68 days.

(21) Appl. No.: 16/593,768

(22) Filed: Oct. 4, 2019

(65) Prior Publication Data

US 2020/0315880 A1 Oct. 8, 2020

(30) Foreign Application Priority Data

Apr. 5, 2019 (JP) .............................. JP2019-072870

(51) Int. Cl.
*A61G 5/08* (2006.01)
*B62D 21/14* (2006.01)
(Continued)

(52) U.S. Cl.
CPC .............. *A61G 5/08* (2013.01); *A61G 5/1056* (2013.01); *B62B 3/02* (2013.01); *B62D 21/14* (2013.01); *A61G 5/125* (2016.11)

(58) Field of Classification Search
CPC ........ A61G 5/04; A61G 7/1067; A61G 5/006; A61G 5/0833; A61G 5/0841;
(Continued)

(56) References Cited

U.S. PATENT DOCUMENTS 6,676,140 B1 * 1/2004 Gondobintoro ........... B62B 7/08  
                                                                                     280/33.993  
7,246,671 B2 * 7/2007 Goren ..................... A61G 5/061  
                                                                                        180/209  
(Continued)

FOREIGN PATENT DOCUMENTS

CA         2214153 A1 * 3/1999 ............... A61G 5/08  
JP      H 10-248879     9/1998  
(Continued)

OTHER PUBLICATIONS

Suzuki exhibits the concept model "kupo" at "2020, Shibuya. Let's experience the daily life of super welfare", Development of a walking assistance vehicle with the function of an electric wheelchair. URL: https://www.suzuki.co.jp/release/c/2018/1102/, Nov. 2, 2018, Publisher: Suzuki Motor Corporation.

*Primary Examiner* — Ruth Ilan  
*Assistant Examiner* — Hilary L Johns  
(74) *Attorney, Agent, or Firm* — Cozen O'Connor

(57) ABSTRACT

A mobile object according to the invention includes: a moving base including a front base and a rear base; a seat including a seating part and a leg part configured so as to support the seating part; and a frame disposed on the rear base, in which the leg part includes: the seating part attaching region to be attached to the seating part, the base attaching region to be attached to the front base so as to be pivotable, and a frame attaching region to be attached to the frame so as to be pivotable, the front and rear bases are movable relative to each other such that the moving base can change between the expanded state and the contracted state of the wheelbase, the pivotal movement of the leg part is interlocked with the relative movement between the front and rear bases, the frame is configured so as to cover the seating part attaching region and the frame attaching region from an outside of the mobile object in the width direction (Continued)

when the moving base is in the expanded state, and cover the base attaching region and the frame attaching region of the leg part from an outside of the mobile object in the width direction when the moving base is in the contracted state.

3 Claims, 5 Drawing Sheets

(51) Int. Cl.
*B62B 3/02* (2006.01)
*A61G 5/10* (2006.01)
*A61G 5/12* (2006.01)

(58) Field of Classification Search
CPC ........... A61G 5/0858; A61G 5/00; A61G 5/08; A61G 5/10; A61G 5/1037; A61G 5/085; A61G 15/1056; A61G 5/125; B62K 5/003; B62K 5/007; B62B 2206/02; B62B 3/02; B62D 21/14
USPC ........................................................ 280/648
See application file for complete search history.

(56) References Cited

U.S. PATENT DOCUMENTS

| | | | | |
|---|---|---|---|---|
| 9,868,456 B2 * | 1/2018 | Stiba | ........................ | B62B 7/008 |
| D811,949 S * | 3/2018 | Stiba | ............................. | D12/129 |
| 10,172,751 B1 * | 1/2019 | Balmer | ................. | A61G 5/0833 |
| 10,744,049 B2 * | 8/2020 | Naber | ..................... | A61G 5/066 |
| 2005/0151334 A1 * | 7/2005 | Flowers | ............... | B62D 11/003 |
| | | | | 280/47.11 |
| 2005/0166312 A1 * | 8/2005 | Cancian | .................. | A47K 3/282 |
| | | | | 4/604 |
| 2008/0129006 A1 * | 6/2008 | Johnson | .................. | A61G 5/128 |
| | | | | 280/149.2 |
| 2009/0315300 A1 * | 12/2009 | Stiba | ......................... | B62B 9/28 |
| | | | | 280/648 |
| 2010/0117328 A1 * | 5/2010 | Johnson | ................. | A61G 5/045 |
| | | | | 280/250.1 |
| 2010/0126789 A1 * | 5/2010 | Scragg | .................... | B62K 5/027 |
| | | | | 180/208 |
| 2014/0159346 A1 * | 6/2014 | Laffan | ....................... | B62B 9/20 |
| | | | | 280/650 |
| 2014/0346756 A1 * | 11/2014 | Laffan | ....................... | B62B 7/10 |
| | | | | 280/648 |
| 2017/0217471 A1 * | 8/2017 | Haut | ....................... | B62B 7/142 |
| 2019/0142665 A1 * | 5/2019 | Spence | ................. | A61G 5/1059 |
| | | | | 297/344.2 |

FOREIGN PATENT DOCUMENTS

| | | |
|---|---|---|
| JP | 2000-005239 | 1/2000 |
| JP | 2001-048497 | 2/2001 |
| JP | 2005-328914 | 12/2005 |
| JP | 2006-103512 | 4/2006 |
| JP | 2009-183407 | 8/2009 |
| JP | 2016-168153 | 9/2016 |

* cited by examiner

MOBILE OBJECT

FIELD OF THE INVENTION

The present invention relates to a mobile object including a moving base configured so as to allow a wheel base to expand and contract, and a seat to be disposed on the moving base.

BACKGROUND OF THE INVENTION

In related art, mobile objects, such as wheelchairs, carts, or the like are used as moving means for users, such as elderly persons, persons needing care, or the like. Typically, the mobile object includes a moving base having front wheels and rear wheels, and a seat to be mounted on the moving base, so that the user is capable of moving in a state of being seated on the seat. As mobile objects, electric vehicles, such as electric wheelchairs, electric carts, or the like which are capable of self-traveling by using driving means, such as motors or the like are widely used. The electric vehicle is also referred to as a "senior car".

The mobile object as described above may be configured so as to be foldable. Specifically, the mobile object may be configured so as to be changeable between an unfolded state in which the moving base is expanded in the front-rear direction to allow the user to ride thereon and to achieve stability during traveling, and a folded state in which the moving base is contracted in the front-rear direction to make the mobile object suitable for a movement by being pushed from the rearward thereof.

In an example of such a mobile object to be presented, the mobile object including: a vehicle body having front wheels and rear wheels, and being configured so as to allow a wheel base to expand and contract; a seat having a seating part and being configured so as to be disposed on the vehicle body; a seat back located rearward of the seat; a basket configured so as to allow storage of baggage; and a handle configured so as to operate the mobile object and staying at a fixed position, in which in an unfolded state, the seating part is disposed so as to allow a user to operate one handle in a state of being seated on the seating part of the seat, the seat back is disposed so as to stand upward from a rear of the seating part, the basket is disposed at a lower part of the vehicle body, in a folded state, the seating part and the basket are disposed above the positions thereof in the unfolded state, the seat back is configured so as to fall toward the seating part. In the mobile object as described above, the same single handle is operated in both the unfolded state and the folded state of the mobile object. (For example, see JP 2016-168153 A).

BRIEF SUMMARY OF THE INVENTION

In the example of the mobile object described above, the seating part and the basket of the seat in the folded state are disposed in the vehicle upper side with respect to the seating part and the basket of the seat in the unfolded state. However, since the seating part occupies a large area in the mobile object so as to allow the user to be stably seated, the seating part often becomes an obstacle when using the mobile object in the folded state. Therefore, the mobile object described above is low in convenience because it cannot be used efficiently in the folded state. In addition, since one single handle is operated in the unfolded state and the folded state in the example of the mobile object described above, the operation of the mobile object in the folded state is difficult in particular. Therefore, the mobile object has a low level of convenience.

In the example of the mobile object described above, a changing mechanism for changing the state between the unfolded state and the folded state, is exposed to the outside of the mobile object. The changing mechanism as described above is inorganic and gives a complicated impression on the user. Therefore, the mobile object of this type does not have a good appearance.

Accordingly, it is desirable to configure the mobile object so as to be capable of using it efficiently in the folded state, capable of improving convenience, and capable of improving the appearance. Consequently, it is desirable to configure the mobile object so as to improve the operability in order to improve the convenience.

To solve the above-described problem, a mobile object according to an aspect is a mobile object including: a moving base including a front base having a front wheel, and a rear base disposed rearward with respect to the front base and having a rear wheel; a seat including a seating part having a seating surface and a leg part configured so as to support the seating part and being configured so as to be disposed above the moving base; and a frame disposed above the rear base, in which the leg part includes a seating part attaching region to be attached to the seating part, a base attaching region to be attached to the front base so as to make the leg part pivotable with respect to the front base, a frame attaching region to be attached to the frame so as to make the leg part pivotable with respect to the frame, the front and rear bases are configured so as to be movable relative to each other such that the moving base can change between an expanded state in which the wheel base between the front wheel and the rear wheel is expanded, and a contracted state in which the wheel base is contracted from the expanded state, the leg part pivots in conjunction with the relative movement between the front and rear bases, the frame is configured so as to cover the seating part attaching region and the frame attaching region of the leg part from an outside of the mobile object in the width direction when the moving base is in the expanded state, and cover the base attaching region and the frame attaching region of the leg part from an outside of the mobile object in the width direction when the moving base is in the contracted state.

In the mobile object of the aspect, the mobile object can be used efficiently in the folded state, convenience can be improved, and the appearance can be improved. Consequently, in the mobile object according to the aspect, the operability can be improved for improving the convenience.

DETAILED DESCRIPTION OF THE INVENTION

In an Embodiment, an electric vehicle configured as a mobile object will be described below. In this specification, the mobile object may have a single seat, and in addition, the mobile object is configured so as to open the seat to the outside of a seat provided thereon. For example, the mobile object may be a wheelchair, a cart, and/or the like, and in particular, the mobile object may be single-seater wheelchair, a single-seater cart, and/or the like. However, the mobile object is not limited to these configurations.

The electric vehicle according to the present Embodiment is configured so as to be capable of traveling by electromotive drive. In the present Embodiment, the electric vehicle is an electric cart, and in particular, is a single-seater electric cart. However, the electric vehicle is not limited to this, and it may be a vehicle other than the electric cart. For example, the electric vehicle can be an electric wheelchair, and in particular, can be a single-seater electric wheelchair. Hereinafter, the electric vehicle is simply called a "vehicle", if necessary.

Figure 1:
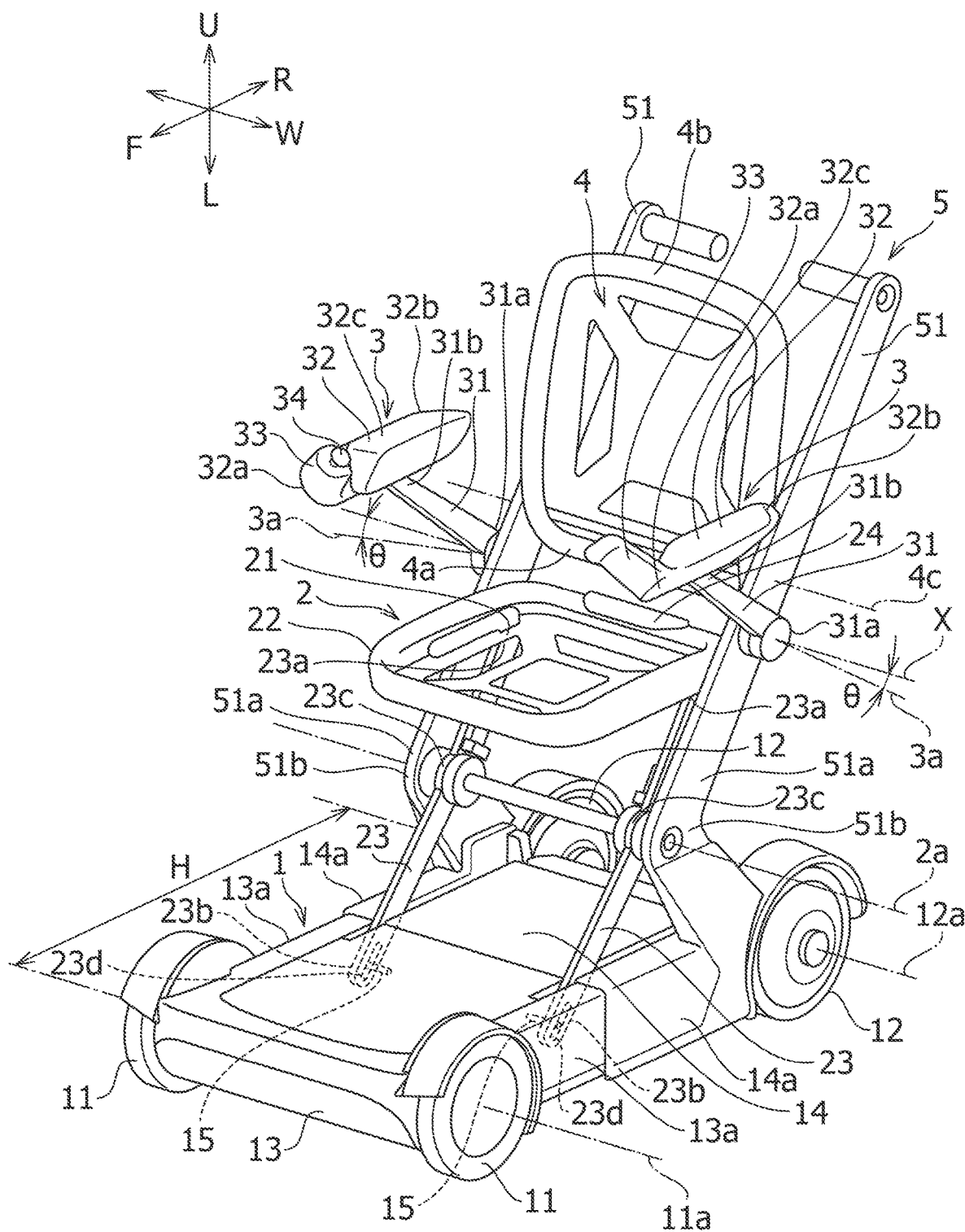
FIG. 1 is a front perspective view schematically showing an electric vehicle according to an Embodiment with a moving base in an expanded state, a seat in a seating position, an armrest being at a position of use, and a back plate in a standing-up position.
Figure 3:
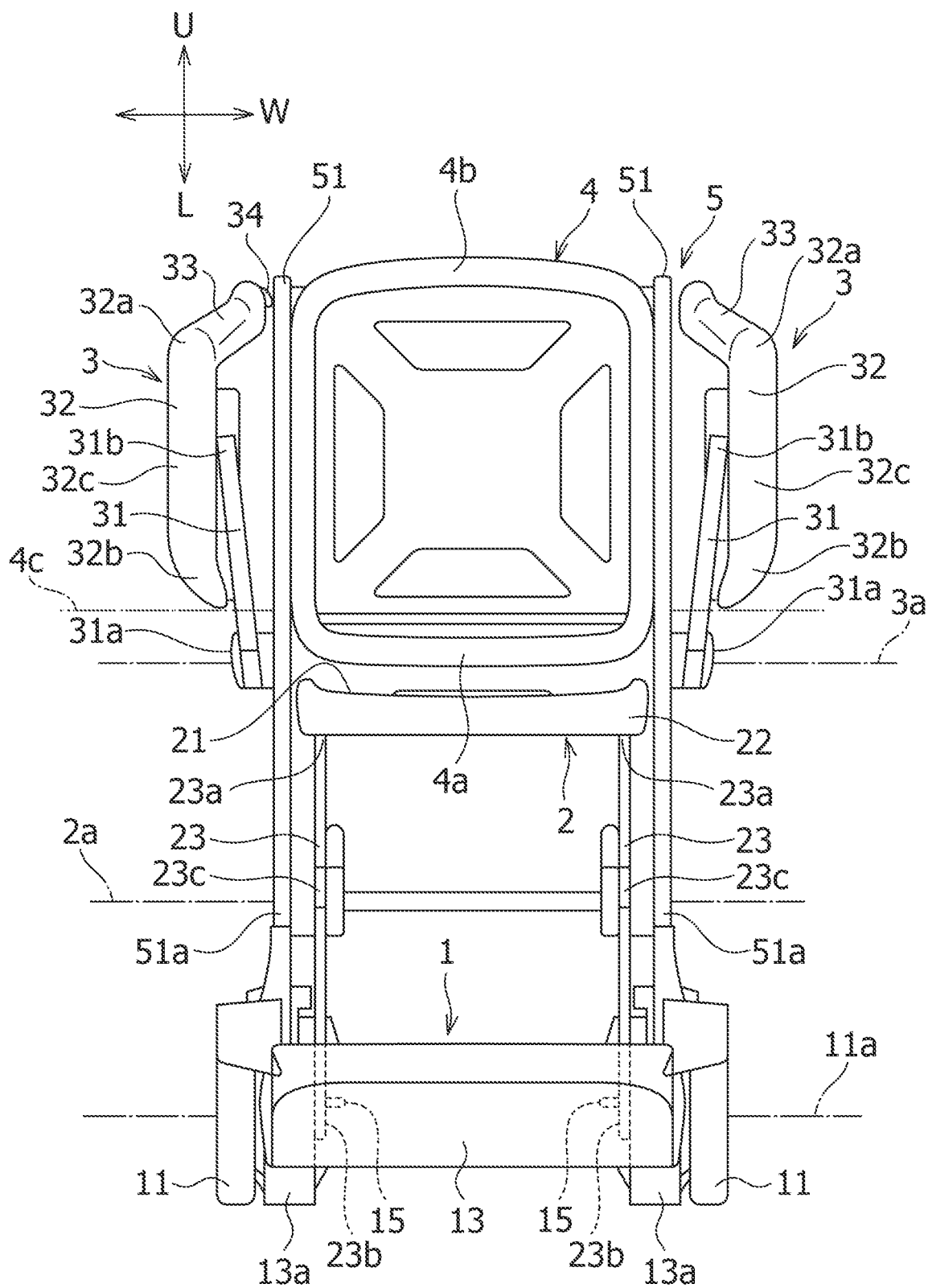
FIG. 3 is a front view schematically showing the electric vehicle according to the Embodiment with the moving base in the expanded state, the seat in the seating position, the armrest being at a lift-up position, and the back plate at the standing-up position.
Figure 4:
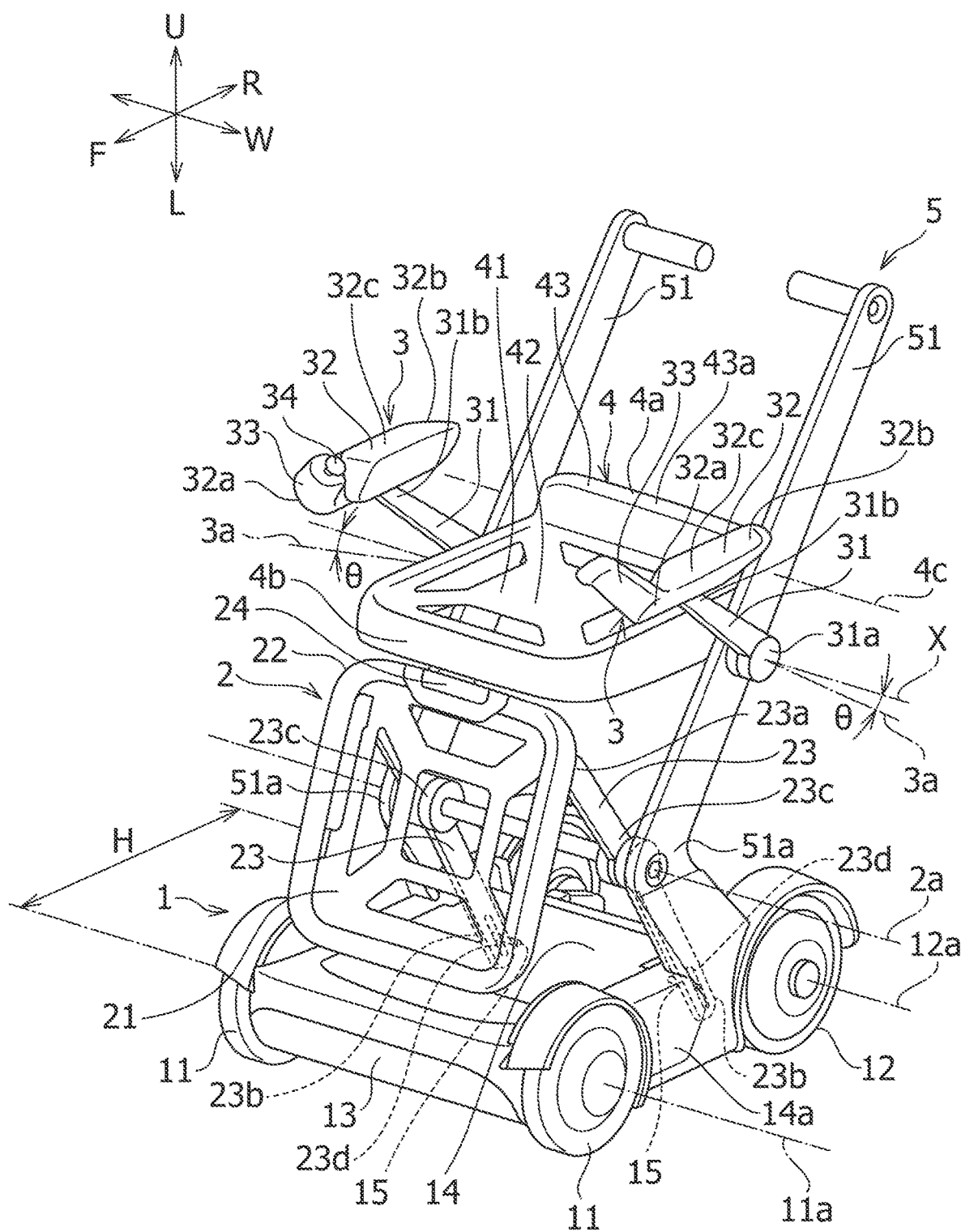
FIG. 4 is a front perspective view schematically showing an electric vehicle according to the Embodiment with a moving base in a contracted state, a seat in a retracting position, the armrest being at a position of use, and a back plate in a lying-down position.
Figure 5:
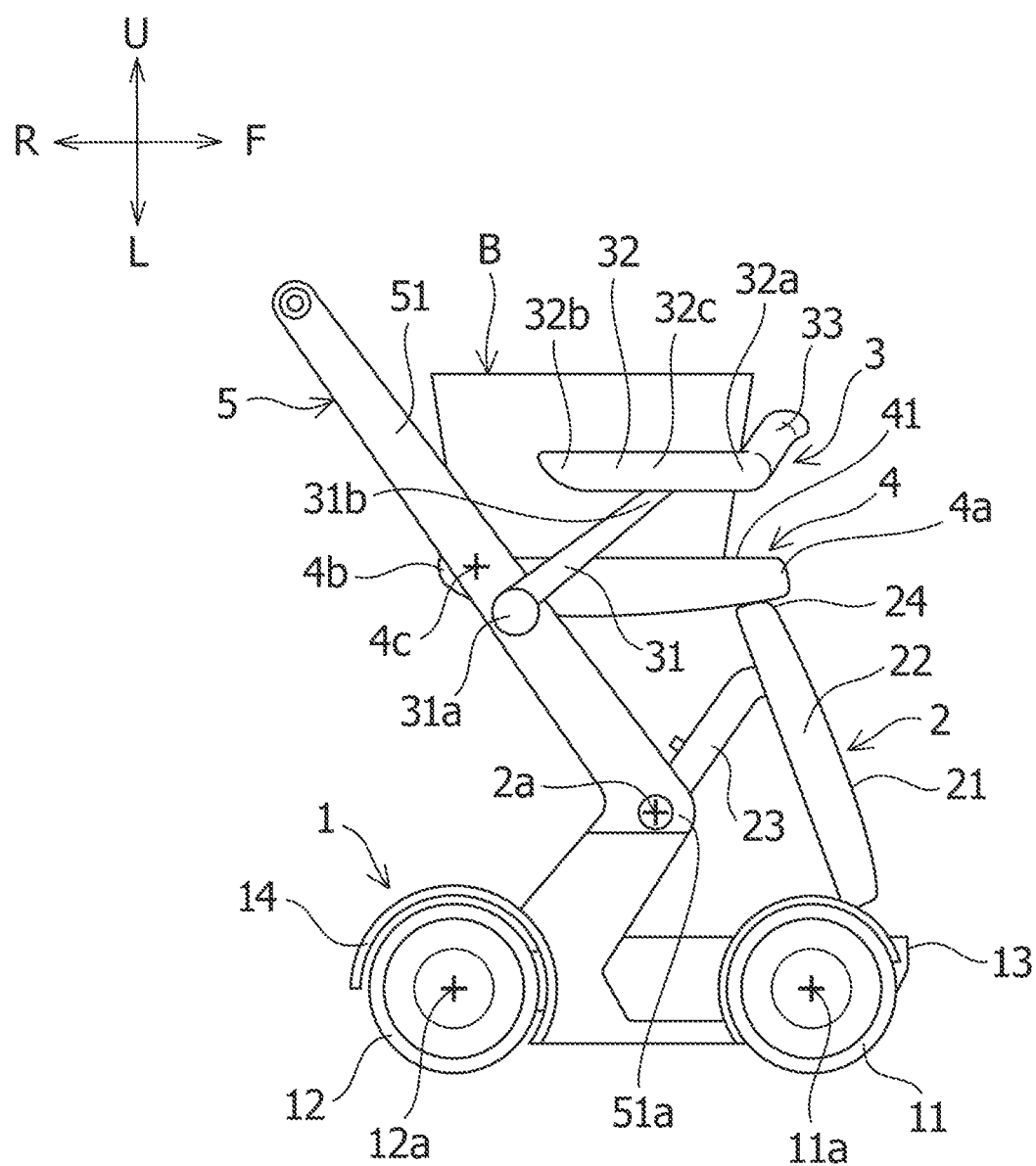
FIG. 5 is a side view schematically showing an electric vehicle according to the Embodiment with a moving base in a contracted state, a seat in a retracting position, the armrest being at a position of use, a back plate in a lying-down position, and the baggage placed on the baggage carrier on the back plate.

Note that in FIGS. 1, 4 and 5 of the drawings used in the description of the present Embodiment, a vehicle front and a vehicle rear are respectively indicated by an arrow F and an arrow R. That is to say, the vehicle front-rear direction is indicated by the arrow F and the arrow R. In FIGS. 1 to 4, a vehicle width direction is indicated by an arrow W. In FIGS. 1 to 5, a vehicle upper side and a vehicle lower side are respectively indicated by an arrow U and an arrow L. That is to say, a vehicle upper-lower direction is indicated by the arrow U and the arrow L.

Overview of Electric Vehicle

The electric vehicle of the present Embodiment will be schematically described. As shown in FIGS. 1 to 5, the vehicle includes a moving base 1 configured so as to be capable of traveling by electromotive drive. The moving base 1 includes two front wheels 11, and two rear wheels 12 which are located in the vehicle rear at a distance from the front wheels 11. The front wheels 11 and the rear wheels 12 serve as traveling wheels of the vehicle. However, the moving base may be configured so as to be capable of traveling by human power. In addition, the moving base may have at least one front wheel and two or more rear wheels, or may have two or more front wheels and at least one rear wheel.

The moving base 1 as described above includes a front base 13 having the front wheels 11, and a rear base 14 having the rear wheels 12. The rear base 14 is disposed at the vehicle rear with respect to the front base 13.

The vehicle includes a seat 2 disposed on the moving base 1. The seat 2 includes a seating part 22 having a seating surface 21 configured so as to allow the user to be seated. In particular, the seat 2 may have a single-seater configuration. However, the seat of the vehicle is not limited thereto.

The seat 2 further includes two leg parts 23 capable of supporting the seating part 22. The two leg parts 23 are disposed at a distance from each other in the seat width direction. The seat width direction is substantially aligned with the vehicle width direction. However, the seat may be configured so as to have at least one leg part.

The vehicle may include an armrest 3 located outwards of the seating surface 21 in a width direction of the vehicle. In particular, the vehicle may have two armrests 3. The two armrests 3 may be positioned on outer sides of the seating surface 21 in the width direction of the vehicle. However, the vehicle may be configured so as to have at least one armrest.

The vehicle may include a back plate 4 configured so as to be capable of being used as a seatback corresponding to the seating surface 21 of the seat 2. The back plate 4 may also be disposed on the moving base 1. The vehicle includes a frame 5 disposed on the rear base 14.

The leg part 23 of the seat 2 includes a seating part attaching region 23a to be attached to the seating part 22. The leg part 23 includes a base attaching region 23b to be attached to the front base 13 so as to made the leg part 23 pivotable with respect to the front base 13. In addition, the leg part 23 has a frame attaching region 23c for attaching the leg part 23 to the frame 5 so as to be pivotable with respect to the frame 5.

Figure 2:
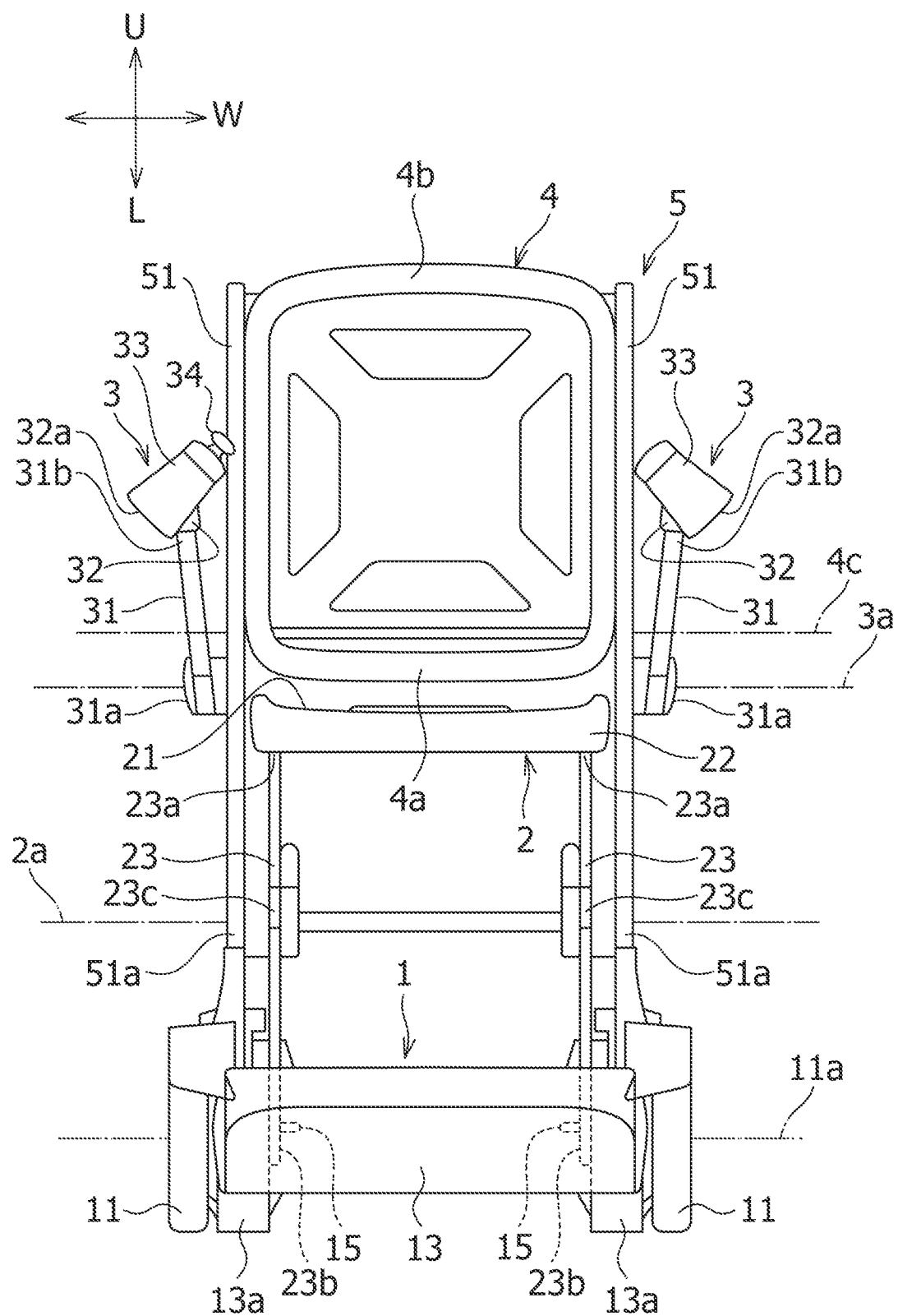
FIG. 2 is a front view schematically showing the electric vehicle according to the Embodiment with the moving base in the expanded state, the seat in the seating position, the armrest being at the position of use, and the back plate at the standing-up position.

The front and rear bases 13 and 14 are configured to be movable relative to each other such that the moving base 1 can change between an expanded state in which the wheel base H between the front wheel 11 and the rear wheel 12 is expanded as shown in FIGS. 1 to 3, and a contracted state in which the wheel base H is contracted from the expanded state as shown in FIGS. 4 and 5. The pivotal movement of the leg part 23 is interlocked with the relative movement between the front and rear bases 13 and 14. The frame 5 is formed so as to cover the seating part attaching region 23a and the frame attaching region 23c of the leg part 23 from an outside in the vehicle width direction when the moving base 1 is in the expanded state as shown in FIGS. 1 to 3, and cover the base attaching region 23b and the frame attaching region 23c of the leg part 23 from an outside in the vehicle width direction when the moving base 1 is in the contracted state as shown in FIGS. 4 and 5.

In addition, the vehicle may be configured as follows. As shown in FIGS. 1 to 3, the seating part attaching region 23a of the leg part 23 of the seat 2 is attached to the seating part 22 so as to be located in a region rearward of the seating part 22 in the seat front-rear direction when the moving base 1 is in an expanded state. As shown in FIGS. 4 and 5, the base attaching region 23b of the leg part 23 is formed so as to be located near a rear end of the rear base 14 in the vehicle front-rear direction and in the vehicle front with respect to the rear wheel 12 when the moving base 1 is in the contracted state.

Referring to FIGS. 1, 4, and 5, the frame 5 includes a post 51 including a portion formed into a substantially dogleg shape (hereinafter, referred to as "dogleg-shaped portion" when necessary) 51a formed so as to cover the seating part attaching region 23a and the frame attaching region 23c of the leg part 23 from an outside in the vehicle width direction when the moving base 1 is in the expanded state, and cover the base attaching region 23b and the frame attaching region 23c of the leg part 23 from an outside in the vehicle width direction when the moving base 1 is in the contracted state. Note that the substantially dogleg-shape may be a curved shape protruding toward the vehicle front.

Details of Moving Base

The moving base 1 may be configured in detail as follows. Referring to FIGS. 1 and 4, the front and rear bases 13 and 14 of the moving base 1 are configured so as to be movable relative to each other to allow the wheel base H between the front wheels 11 and the rear wheels 12 to be expanded and contracted. However, the moving base may be configured so as to keep the wheel base unchanged. In other words, the moving base may be configured so as not to allow the wheel base to be expanded and contracted.

Furthermore, by the relative movement of the front and rear bases 13 and 14, the moving base 1 can be changed between the expanded state in which the wheel base H is expanded as shown in FIG. 1, and the contracted state in which the wheel base H is contracted so as to shorten the length of the wheel base H than the length in the expanded state as shown in FIG. 4. In addition, the moving base 1 described above is configured so as to allow the rear wheels 12 to be driven and make the front wheels 11 stop for expanding and contracting the wheel base H. In other words, when expanding the wheel base H, the rear wheels 12 are driven to rotate to move the rear base 14 toward the vehicle rear, and the front wheels 11 are stopped to immobilize the front base 13 at a certain position. In contrast, when contracting the wheel base H, the rear wheels 12 are driven to rotate to move the rear base 14 toward the vehicle front and the front wheels 11 are stopped to immobilize the front base 13 at a certain position.

However, the moving base may be configured in such a manner that the front wheels are driven and the rear wheels are stopped in order to expand and contract the wheel base. The moving base may be configured in such a manner that the front wheels and the rear wheels are driven to rotate in the opposite directions from each other in order to expand and contract the wheel base.

Referring to FIGS. 1 and 4, the front and rear bases 13 and 14 of the moving base 1 are configured so as to be substantially linearly slidable relative to each other in the vehicle front-rear direction. In particular, the difference in length of the wheel base H between the expanded state and the contracted state of the moving base 1 may be at least a half the maximum length of the seat 2 in the seat front-rear direction and not longer than the maximum length of the seat 2. Note that the seat front-rear direction is substantially orthogonal to the seat width direction, and is a direction extending between the front surface and the back surface of the seating part 22. The seat width direction is substantially aligned with the vehicle width direction. The vehicle can travel stably while stably supporting a user riding thereon when the moving base 1 is in the expanded state, and the vehicle can move in a zippy manner when the moving base 1 is in the contracted state.

As shown in FIGS. 1 to 5, the front base 13 of the moving base 1 includes two anterior side members 13a disposed at a distance from each other in the vehicle width direction. The two front wheels 11 are respectively attached to the two anterior side members 13a at front end portions in the vehicle front-rear direction so as to be rotatable about an axis of rotation 11a extending in the vehicle width direction.

Each of the anterior side members 13a is provided with a pivot shaft 15 at a rear end portion thereof in the vehicle front-rear direction so as to protrude therefrom in the vehicle width direction. As will be described in detail later, a leg part 23 of the seat 2 is attached to the pivot shaft 15. Both of the pivot shafts 15 are disposed so as to avoid interference with the rear base 14 when the front and rear bases 13 and 14 move relative to each other.

As shown in FIG. 1, the pivot shafts 15 may be positioned at front end portions of the posterior side members 14a in the vehicle front-rear direction when the moving base 1 is in the expanded state. The pivot shafts 15 may be positioned in the vicinity of the rear wheels 12 when the moving base 1 is in the contracted state.

In addition, the rear base 14 of the moving base 1 includes two posterior side members 14a disposed at a distance from each other in the vehicle width direction. The two rear wheels 12 are respectively attached to the two posterior side members 14a at rear end portions in the vehicle front-rear direction so as to be rotatable about an axis of rotation 12a extending in the vehicle width direction.

Although not particularly shown, a battery serving as a power supply source for the vehicle and a control device for electrically controlling the vehicle are mounted on the moving base 1. A braking device is mounted on the front base 13 of the moving base 1 so as to be capable of braking the two front wheels 11. Drive motors for driving the rear wheels 12 to rotate is mounted on the rear base 14 of the moving base 1. For example, the drive motors may be disposed to be adjacent to the respective rear wheels 12 in the vehicle width direction, or the drive motors may be built in the respective rear wheels 12. However, the drive motor is not limited thereto.

In the vehicle configured in this manner, the braking device, the control device and the drive motors are electrically connected to the battery, respectively. The battery is capable of supplying power to the braking device, the control device, and the drive motors, respectively. The control device is connected to the braking device and the drive motors respectively. The control device is capable of controlling the braking device, the battery and the drive motors, respectively.

Details of Seat

The seat 2 may be configured in detail as follows. The seat 2 is configured so as to be movable between the seating position in which the seating part 22 is positioned with the seating surface 21 facing the vehicle upper side as shown in FIGS. 1 to 3, and the retracting position in which the seating part 22 is retracted from the seating position to the vehicle front as shown in FIGS. 4 and 5.

Referring to FIGS. 1 to 5, the movement of the seat 2 between the seating position and the retracting position is interlocked with the relative movement between the front and rear bases 13 and 14. In the seat 2, the seating part 22 is configured so as to move to the vehicle front along with the movement of the leg part 23 in association with the relative movement of the front and rear bases 13 and 14 in the vehicle front-rear direction for contracting the wheel base H. The seating part 22 is configured so as to move to the vehicle rear along with the movement of the leg part 23 in association with the relative movement of the front and rear bases 13 and 14 in the vehicle front-rear direction for expanding the wheel base H.

As shown in FIGS. 1 to 3, the seating part 22 is disposed at the seating position when the moving base 1 is in the expanded state. The seat 2 may be disposed such that the seating surface 21 of the seating part 22 extends substantially along a vehicle horizontal direction when the seating part 22 is in the seating position.

As shown in FIG. 4, the seat 2 is positioned in the retracting position when the moving base 1 is in the contracted state. The seat 2 may be arranged such that the seating surface 21 of the seating part 22 is directed at a predetermined angle with respect to a plane extending in the vehicle upper-lower direction and the vehicle width direction when the seating part 22 is in the retracting position. The predetermined angle may be approximately 30 degrees or less in absolute value. However, the angle of the seating surface is not limited thereto.

As shown in FIGS. 1 to 5, a front end region of the seating part 22 in the seat front-rear direction is a free end. In a state in which the seat 2 is in the seating position, the front end region of the seating part 22 is located at the vehicle front with respect to a rear end region of the seating part 22 in the seat front-rear direction, and the rear end region of the seating part 22 is positioned so as to substantially be aligned with the frame 5 in the vehicle front-rear direction. In a state in which the seat 2 is in the retracting position, the rear end region of the seating part 22 is located at the vehicle upper side with respect to the front end region of the seating part 22, and is positioned at a distance to the vehicle front with respect to the frame 5.

In addition, as shown in FIGS. 4 and 5, the seat 2 is also provided with a back plate supporting mechanism 24 configured so as to support the back plate 4 in a state in which the seat 2 and the back plate 4 are in the retracting position and in the lying-down position respectively. The back plate supporting mechanism 24 corresponds to the rear end region of the seating part 22 in the seat front-rear direction. However, the invention is not limited thereto.

Each of the leg parts 23 extends so as to be inclined from the rear to the front in the seat front-rear direction as it goes from the upper to the lower in the seat upper-lower direction. Note that the seat upper-lower direction is substantially orthogonal to the seat width direction and the seat front-rear direction. Each of the leg parts 23 also extends downward in the seat upper-lower direction from a side end region of the seating part 22 in the seat width direction on a side corresponding to each of the leg parts 23. The seating part attaching region 23a of the leg part 23 is located at a rear end of the side end region in the seat front-rear direction in a side end region of the seating part 22 in the seat width direction or at a side end of the rear end region of the seating part 22 in the seat width direction.

The base attaching region 23b of the leg part 23 is attached to the pivot shaft 15 of the anterior side member 13a so as to be pivotable. More specifically, the base attaching region 23b is provided with an attaching long hole 23d penetrating therethrough in the vehicle width direction so as to allow insertion of the pivot shaft 15 therethrough. The attaching long hole 23d extends along the longitudinal direction of the leg part 23. When the front base 13 moves in the vehicle front-rear direction with respect to the rear base 14, the pivot shaft 15 moves in the longitudinal direction of the attaching long hole 23d in the attaching long hole 23d.

The frame attaching region 23c is positioned between the seating part attaching region 23a and the base attaching regions 23b. The base attaching regions 23b of each of the leg parts 23 may be located at a lower end of the leg part 23 in the seat upper-lower direction, and the frame attaching region 23c of each of the leg parts 23 may be located in an intermediate region of the corresponding leg part 23 in the seat upper-lower direction.

In the seat 2 configured in this manner, the movement of the seating part 22 toward the vehicle front is achieved by the movement of the base attaching regions 23b of the leg parts 23 to the vehicle rear in association with the relative movement of front and rear bases 13 and 14 with each other in the vehicle front-rear direction for contracting the wheel base H and the pivotal movement of the leg parts 23 toward the vehicle front. The seating part 22 can be moved from the seating position to the retracting position by the movement thereof toward the vehicle front.

The relative movement of the front and rear bases 13 and 14 in the vehicle front-rear direction for expanding the wheel base H, causes the movement of the base attaching regions 23b of the leg parts 23 toward the vehicle front, and the pivotal movement of the leg parts 23 toward the vehicle rear, whereby the movement of the seating part 22 toward the vehicle rear is achieved. The seat 2 can move from the retracting position to the seating position by the movement thereof toward the vehicle rear.

Details of Armrests

The armrests 3 may be configured in detail as follows. As shown in FIGS. 1 to 5, the armrests 3 are disposed in the vehicle upper side with respect to the back plate 4 at the lying-down position. The armrests 3 each include a supporting part 31 supported on the moving base 1 and a body part 32 supported by the supporting part 31. The body part 32 is also supported on the moving base 1. The armrests 3 each include a grip 33 protruding from the body part 32. Specifically, as shown in FIGS. 1 and 5, the grip 33 protrudes from the body part 32 toward the seat 2 so as to allow the user seated on the seating surface 21 of the seat 2 to hold the grip 33 when the seat 2 is at the seating position, and protrudes from the body part 32 toward the baggage carrier 41 of the back plate 4 when the back plate 4 is at the lying-down position.

The armrests 3 may be positioned in the vehicle upper side with respect to the seating part 22. The supporting parts 31 of the two armrests 3 are respectively attached to two posts 51 of the frame 5, described later, such that the two armrests 3 are pivotable about the pivot axes 3a respectively.

The armrests 3 are configured so as to be changeable in position between the position of use and the lift-up position. Specifically, as shown in FIGS. 1, 2, 4 and 5, the armrests 3 at the position of use are disposed so as to allow the user seated on the seating surface 21 to hold the grips 33 while placing the arms in the vehicle upper side with respect to the armrests 3. As shown in FIG. 3, the armrests 3 are disposed at the lift-up position so as to lift up the grips 33 toward the vehicle upper side with respect to the position of use. Referring to FIGS. 1 to 5, the grips 33 positioned at the lift-up position are located outward of the grips 33 at the position of use in the width direction of the vehicle.

As shown in FIGS. 1 to 5, the supporting part 31 of each of the armrests 3 is supported so as to be pivotable about a pivot axis 3a between the position of use and the lift-up position of the armrests 3. As shown in FIGS. 1 and 4, the pivot axis 3a is inclined from a center in a width direction of the vehicle outward in the width direction of the vehicle as it goes from the vehicle rear to the vehicle front. As shown in FIGS. 1 to 5, in a state in which the armrests 3 are at the position of use, the grips 33 protrude from the body parts 32 of the armrests 3 so as to incline from an outer side in the width direction of the vehicle toward the center of the vehicle in the width direction as it goes from the vehicle lower side toward the vehicle upper side.

The supporting part 31 of each of the armrests 3 may have a supporting region 31a to be attached so as to be pivotable to the post 51 corresponding to this armrest 3. In addition, in each of the armrests 3, the supporting part 31 may be provided at a connecting region 31b to be connected to the body part 32. The supporting region 31a and the connecting region 31b of the supporting part 31 are positioned at a distance from each other. The supporting region 31a is positioned in the vehicle lower side with respect to the connecting region 31b. The supporting part 31 of the armrest 3 is positioned in the vehicle upper side with respect to the base end part 4a of the back plate 4.

The body part 32 of each of the armrests 3 has a leading end region 32a and a base end region 32b which face each other, and an intermediate region 32c which extends between the leading end region 32a and the base end region 32b. The grip 33 protrudes from a leading end region 32a of the body part 32. When each of the armrests 3 is in the position of use, the leading end region 32a of the body part 32 of the armrest 3 is positioned in the vehicle front with respect to the base end region 32b.

When each of the armrests 3 is in the lift-up position, the leading end region 32a of the body part 32 of the armrest 3 is positioned in the vehicle upper side with respect to the base end region 32b. In particular, when each of the armrests 3 is in the lift-up position, the supporting part 31, the body part 32, or the grip 33 of the armrest 3 may be positioned so as to be substantially aligned with the back plate 4 in the standing-up position in the vehicle front-rear direction, or may be positioned in the vehicle rear with respect to the back plate 4 in the standing-up position.

The grip 33 on one of the two armrests 3 includes an operation part 34 configured so as to allow the vehicle to be operable. In particular, the operation part 34 may be configured so as to allow the user to operate with one hand. The operation part 34 may be a joystick. However, each of the grips of the two armrests may have the operation part. The operation part is not limited thereto, and may be a button, a touch-sensitive board, a lever, a dial-type knob, and/or the like.

The pivot axis 3a of each of the armrests 3 may pass through the supporting region 31a of the supporting part 31, and incline toward the vehicle front with respect to the axial line X in the width direction extending in the vehicle width direction by an angle of inclination θ. The angle of inclination θ may be the same for the two armrests 3. The angle of inclination θ may fall within a range from approximately 5 degrees to approximately 15 degrees. For example, the angle of inclination θ may be approximately 10 degrees. However, the angle of inclination is not limited thereto, and the angle of inclination of two of the armrests may be different. The angle of inclination may be set to allow a user in a state of being seated on the seating surface of the seat to pivot the armrests between the position of use and the lift-up position.

In addition, the pivot axis 3a may be positioned along the horizontal plane. However, the pivot axis is not limited thereto, and the pivot axis may be inclined toward the vehicle upper side or the vehicle lower side with respect to the horizontal plane.

Details of Back Plate

The back plate 4 may be configured in detail as follows. The back plate 4 is configured to be movable between a standing-up position located in the vehicle rear and the vehicle upper side with respect to the seating part 22 of the seat 2 when at the seating position as shown in FIGS. 1 to 3 and a lying-down position located in the vehicle front of the standing-up position as shown in FIGS. 4 and 5. As shown in FIGS. 4 and 5, the back plate 4 includes a baggage carrier 41 formed on a back surface facing toward the vehicle upper side when at the lying-down position and being formed so as to allow a baggage B (shown in FIG. 5) to be placed thereon.

In addition, the vehicle may be configured as follows. As shown in FIG. 4, the baggage carrier 41 includes a placing surface 42 formed so as to allow the baggage B to be placed thereon when the back plate 4 is at the lying-down position, and a baggage stop 43 projecting from at least part of an outer peripheral edge portion of the placing surface 42. Furthermore, in a state in which the back plate 4 is at the lying-down position, the placing surface 42 inclines so as to be lowered as it goes from the vehicle front to the vehicle rear, and the baggage stop 43 includes a rear baggage stop part 43a protruding from a rear edge portion of the placing surface 42 in the vehicle front-rear direction. Note that although detailed description will be given later, the baggage stop may have another baggage stop portion instead of, or in addition to the rear baggage stop portion.

Referring to FIGS. 1 and 4, the back plate 4 is attached to the frame 5 so as to be pivotable between the standing-up position and the lying-down position. As shown in FIG. 1, the back plate 4 is disposed along a plane extending in the vehicle width direction and the vehicle upper-lower direction in a state of being at the standing-up position. As shown in FIGS. 4 and 5, the back plate 4 is disposed such that the placing surface 42 is inclined to be lowered from the vehicle front to the vehicle rear as described above in a state of being at the lying-down position. The back plate 4 at the lying-down position is located at the vehicle lower side and toward the center in the width direction of the vehicle with respect to the armrests 3 in the position of use.

As shown in FIGS. 1 to 5, the back plate 4 is formed into a substantially flat plate shape. The back plate 4 in the standing-up position includes a base end part 4a and a leading end part 4b located on the lower end side and the upper end side, respectively, in the vehicle upper-lower direction. The base end part 4a of the back plate 4 may be attached to two posts 51 of the frame 5, described later, such that the back plate 4 is pivotable about the pivot axis 4c extending in the vehicle width direction. More specifically, the base end part 4a of the back plate 4 is attached to an intermediate portion of the posts 51 in the vehicle upper-lower direction.

The leading end part 4b of the back plate 4 is a free end. The leading end part 4b of the back plate 4 configured as described above is pivotable about the pivot axis 4c between the standing-up position and the lying-down position. In addition, as shown in FIGS. 4 and 5, in a state in which the seat 2 is in the retracting position and the back plate 4 is in the lying-down position, the leading end part 4b of the back plate 4 is supported by the back plate supporting mechanism 24 of the leg parts 23 of the seat 2.

Referring further to FIGS. 4 and 5, in a state in which the back plate 4 is in the lying-down position, the baggage B can be placed on the placing surface 42 of the baggage carrier 41 of the back plate 4. Typically, the baggage B placed on the placing surface 42 may be the shopping basket, the luggage, and/or the like. Furthermore, the baggage B may be a rigid shopping basket provided in supermarkets, shopping centers, and/or the like. However, the baggage placed on the placing surface is not limited thereto. The baggage may be any object as long as it can be placed on the placing surface. For example, such the baggage may be a cardboard box, a case, and/or the like.

As shown in FIG. 4, the baggage stop 43 includes the rear baggage stop part 43a as described above. However, the baggage stop may have a baggage stop portion protruding from part or the entire part of the outer peripheral edge portion of the placing surface. The baggage stop may have a plurality of baggage stop portions apart from each other in the direction of the outer periphery of the placing surface, or may be formed integrally so as to continue in the outer peripheral direction of the placing surface. For example, the baggage stop may have a front baggage stop portion protruding from a front edge portion of the placing surface in the vehicle front-rear direction. The baggage stop may have a side baggage stop portion protruding from at least one of both side edge portions of the placing surface in the vehicle width direction.

Details of Frame

The frame 5 may be configured in detail as follows. As shown in FIGS. 1 to 5, the frame 5 is disposed so as to be adjacent to a rear end region of the seating part 22 of the seat 2 located at the seating position. The two posts 51 of the frame 5 are disposed at a distance from each other in the vehicle width direction. The two posts 51 are disposed so as to correspond to the posterior side members 14a of the rear base 14 respectively in the vehicle width direction. The two posts 51 are disposed so as to respectively correspond to the two leg parts 23 of the seat 2 in the vehicle width direction.

A lower end portion of each of the posts 51 in the vehicle upper-lower direction is attached to a rear end portion of the posterior side members 14a corresponding to this post 51 in the vehicle front-rear direction. Each of the posts 51 include a seat pivoting attaching part 51b configured so as to be capable of attaching the frame attaching region 23c of the leg part 23 of the seat 2, which corresponds to this post 51. The frame attaching region 23c configured in this manner is attached to a seat pivoting attaching part 51b so as to be pivotable about the pivot axis 2a extending in the vehicle width direction.

The seat pivoting attaching part 51b is disposed between a front end and a rear end of the rear base 14 in the vehicle front-rear direction. In particular, as shown in FIGS. 1 to 3, the seat pivoting attaching part 51b may be disposed in a lower region in the vehicle upper-lower direction of each of the posts 51 located in the vehicle lower side with respect to the seating part 22 of the seat 2 in the seating position. The lower region of the post 51 may include a dogleg-shaped portion 51a. The seat pivoting attaching part 51b may be located at an apex of the dogleg-shaped portion 51a.

In addition, an entire part of the lower region of the post 51 may be configured as the dogleg-shaped portion 51a. The entire part of the post 51 may also be configured as the dogleg-shaped portion 51a. However, the invention is not limited thereto and, for example, the entire part of the lower region of the post or the entire part of the post may be formed so as to include the dogleg-shaped portion. The entire part of the lower region of the post or the entire part of the post may be formed into a substantially X-shape into a substantially lambda shape so as to include the dogleg-shaped portion.

Unfolded State and Folded State of Electric Vehicle

The unfolded state and the contracted state of the electric vehicle will be described. As shown in FIG. 1, the vehicle assumes an unfolded state when the moving base 1 is in the expanded state and the seat 2 is in the seating position. When the vehicle is in the unfolded state, the vehicle is capable of traveling by operating an operation part 34 with a user in a riding state. When the vehicle is in the unfolded state, the vehicle is capable of traveling by pushing the vehicle with the user, an assistant, and/or the like positioned in the vehicle rear. The vehicle in the unfolded state can be used as a wheelchair, a cart, and/or the like.

As shown in FIG. 4, the vehicle assumes the folded state when the moving base 1 is in the contracted state and the seat 2 is at the retracting position. The vehicle in the folded state is also capable of traveling by pushing the vehicle with the user positioned in the vehicle rear. The vehicle in the folded state can be used as a walking assisting vehicle, a shopping cart, a wheeled platform, and/or the like.

As described thus far, the electric vehicle according to the present Embodiment includes: the moving base 1 including the front base 13 and the rear base 14, the seat 2 having the seating part 22 and the leg part 23, and the frame 5 disposed on the rear base 14, the leg part 23 includes: the seating part attaching region 23a to be attached to the seating part 22, the base attaching region 23b to be attached to the front base 13 so as to make the leg part 23 pivotable with respect to the front base 13, and the frame attaching region 23c for attaching the leg part 23 to the frame 5 so as to be pivotable with respect to the frame 5, the front and rear bases 13 and 14 are movable relative to each other such that the moving base 1 can change between the expanded state and the contracted state, the pivotal movement of the leg part 23 is interlocked with the relative movement between the front and rear bases 13 and 14, the frame 5 is formed so as to cover the seating part attaching region 23a and the frame attaching region 23c of the leg part 23 from an outside in the vehicle width direction when the moving base 1 is in the expanded state, and cover the base attaching region 23b and the frame attaching region 23c of the leg part 23 from an outside in the vehicle width direction when the moving base 1 is in the contracted state.

Therefore, when the moving base 1 changes from the contracted state to the expanded state, the seating part 22 of the seat 2 can move forward from the retracting position assumed when the moving base 1 is in the contracted state toward the seating position assumed when the moving base 1 is in the expanded state by the movement of the leg part 23 of the seat 2 in association with the forward movement of the front base 13. In the expanded state of the moving base 1, the seating part 22 is stably maintained in a state of occupying the space in the vehicle (hereinafter, referred to as "seating space"), the user can be stably seated on the seating part 22. Therefore, the unfolded state of the electric vehicle in which the seating part 22 of the seat 2 is at the seating position so that the user can stably be seated and the moving base 1 is at the expanded state so that the vehicle can travel stably is easily achieved.

In contrast, when the moving base 1 changes from the expanded state to the contracted state, the seating part 22 of the seat 2 can move rearward from the seating position assumed when the moving base 1 is in the expanded state toward the retracting position assumed when the moving base 1 is in the contracted state by the movement of the leg part 23 of the seat 2 in association with the rearward movement of the front base 13. When the moving base 1 is in the contracted state, the seating part 22 moves forward so as to retract from the seating space, so that the baggage B such as the shopping basket and/or the like can be placed in the seating space over the moving base 1 in the contracted state. Therefore, the folded state of the mobile object in which the seating part 22 is in the retracting position to provide a space for allowing the baggage B to place and the moving base 1 is in the contracted state so as to allow the vehicle to move in a zippy manner is easily achieved. In addition, the unfolded state and the folded state of the electric vehicle can easily be switched. Therefore, the electric vehicle can be used efficiently as a walking aid vehicle, a shopping cart, a carriage, and/or the like in the folded state.

In addition, since the change of the seat 2 between the seating position and the retracting position is interlocked with the change of the moving base 1 between the expanded state and the contracted state, the unfolded state of the mobile object in which the seat 2 is at the seating position and the moving base 1 is at the expanded state and the folded state of the electric vehicle in which the seat 2 is at the retracting position and the moving base 1 is in the contracted state can be switched easily, for example, by a manual operation of the seat 2. Therefore, the convenience of the mobile object can be improved. In addition, a mechanism for changing the vehicle into the unfolded and folded states can be hidden efficiently by the frame 5. Therefore, the appearance of the mobile object is improved.

The electric vehicle of the present Embodiment is configured in such a manner that the seating part attaching region 23a of the leg part 23 is attached to the seating part 22 so as to be located in a region rearward of the seating part 22, and the base attaching region 23b of the leg part 23 is located at a position closer to the rear end of the rear base 14 in the vehicle front-rear direction when the moving base 1 is in the contracted state and in the vehicle front with respect to the rear wheel 12. Therefore, when the moving base 1 changes between the expanded state and the contracted state, the seating part 22 of the seat 2 can be moved forward and rearward stably and smoothly, and thus, the efficient usage of the electric vehicle is achieved. Therefore, the convenience of the electric vehicle can be improved.

In the electric vehicle of the present Embodiment, the frame 5 includes a post 51 including a dogleg-shaped portion 51a configured to cover the seating part attaching region 23a and the frame attaching region 23c of the leg part 23 from an outside in the vehicle width direction when the moving base 1 is in the expanded state, and cover the base attaching region 23b and the frame attaching region 23c of the leg part 23 from an outside in the width direction when the moving base 1 is in the contracted state. Therefore, a mechanism for changing the vehicle into the unfolded and folded states can be hidden efficiently by the dogleg-shaped portion 51a of the post 51. In addition, the dogleg-shaped portion 51a of the post 51 provides a superior aesthetic. Therefore, the appearance of the electric vehicle can be improved.

While the Embodiment of the invention has been described thus far, the invention is not limited to the Embodiment described above, and the invention may be modified and altered based on the technical concept of the invention.

What is claimed is:

1. A mobile object comprising:
   a moving base including a front base having a front wheel, and a rear base disposed rearward with respect to the front base and having a rear wheel;
   a seat including a seating part having a seating surface, and a leg part configured so as to support the seating part, the seat configured so as to be disposed above the moving base; and
   a frame disposed on the rear base, wherein
   the leg part includes a seating part attaching region to be attached to the seating part, a base attaching region to be attached to the front base so as to make the leg part pivotable with respect to the front base, and a frame attaching region to be attached to the frame so as to make the leg part pivotable with respect to the frame,
   the front and rear bases are configured so as to be movable relative to each other such that the moving base can change between an expanded state in which the wheel base between the front wheel and the rear wheel is expanded, and a contracted state in which the wheel base is contracted from the expanded state,
   the leg part pivots in conjunction with the relative movement between the front and rear bases, and
   the frame is configured so as to cover the seating part attaching region and the frame attaching region of the leg part from an outside of the mobile object in the width direction when the moving base is in the expanded state, and cover the base attaching region and the frame attaching region of the leg part from an outside of the mobile object in the width direction when the moving base is in the contracted state.

2. The mobile object according to claim 1, wherein
   the seating part attaching region of the leg part is attached to the seating part so as to be located in a region rearward of the seating part, and
   the base attaching region of the leg part is located at a position closer to the rear end of the rear base and at a position forward of the rear wheel when the moving base is in the contracted state.

3. The mobile object according to claim 1, wherein
   the frame includes a post including a portion formed into a dogleg shape formed so as to cover the seating part attaching region and the frame attaching region of the leg part from an outside of the mobile object in the width direction when the moving base is in the expanded state, and cover the base attaching region and the frame attaching region of the leg part from an outside of the mobile object in the width direction when the moving base is in the contracted state.

* * * * *